Patented July 12, 1927.

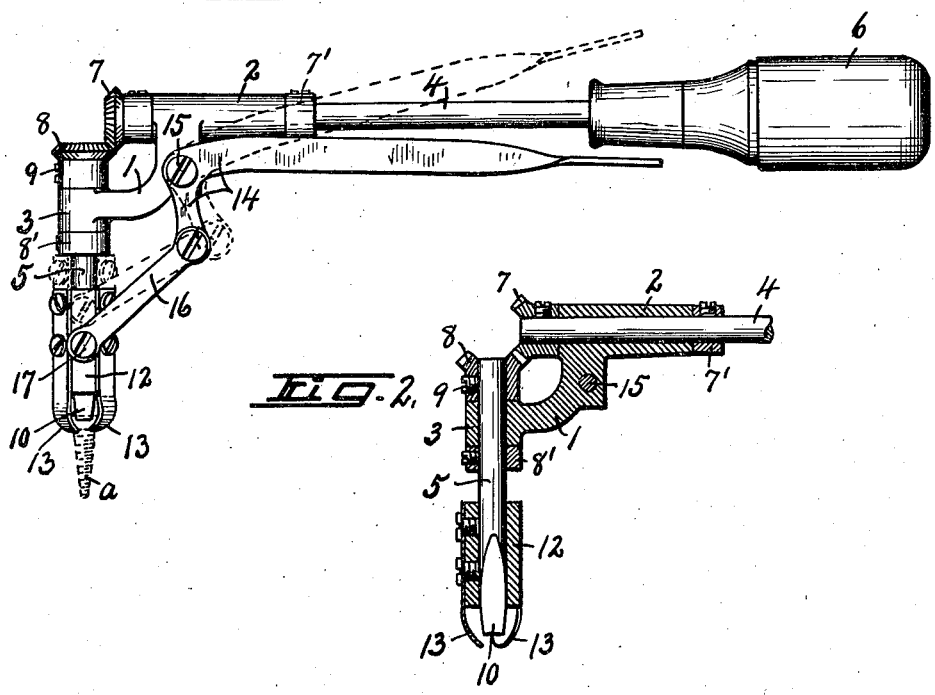
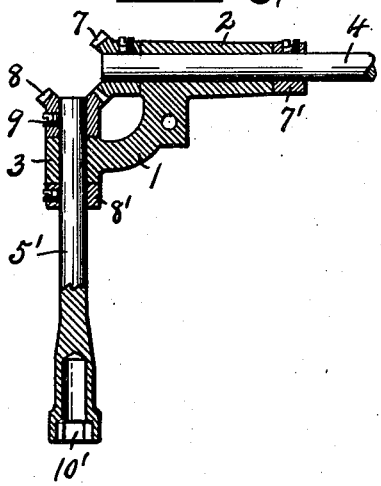
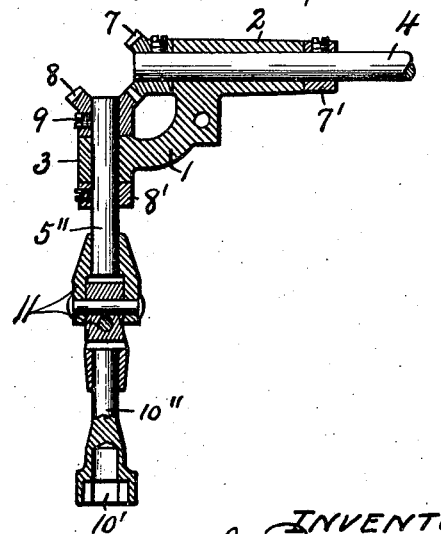

1,635,437

UNITED STATES PATENT OFFICE.

JEREMIAH RYAN, OF SYRACUSE, NEW YORK.

OFFSET TOOL HOLDER.

Application filed December 8, 1925. Serial No. 74,009.

This invention relates to an offset tool holder of the hand operated type for receiving screw-drivers, socket wrenches and other tools for tightening and loosening screws, bolts, nuts and other objects which are located in more or less remote places inaccessible to the usual straight tool holder.

The device, briefly stated, comprises a rotary tool holder and a rotary handle journaled in a connecting yoke at right angles to each other and geared together for transmitting rotary motion from the handle to the tool holder so that the yoke with the tool holder thereon may be adjusted angularly about the axis of the handle to operate upon a screw, bolt, or nut in any direction at right angles to said axis.

The main object is to provide a simple implement of this character capable of being used for many purposes or rather one which is capable of receiving different kinds of tools according to the nature of the work.

Another object is to arrange the tool holder wholly to one side of the axis of the handle except as it may be turned about said axis.

A further object is to provide the device with means within convenient reaching distance of the handle for operating a suitable work-engaging chuck to open and close the same upon the work as may be required.

A further object is to utilize one of the gears as a tool chuck in addition to its function for transmitting motion from the handle to the tool.

Other objects and uses relating to specific parts of the device will be brought out in the following description.

In the drawings:

Figure 1 is a side elevation of an offset tool holder embodying the various features of my invention as applied to a screw-driver.

Figures 2, 3, and 4 are longitudinal sectional views of the connecting yoke and gears between the handle shaft and tool shaft showing different forms of tools which may be attached to one and the same gear chuck.

As illustrated, this device comprises a yoke —1— having terminal journal bearings —2— and —3— at right angles to each other for receiving respectively a hand rotated driving shaft or spindle —4— and a driven tool spindle —5— which are also disposed at right angles to each other with their axes intersecting at a common point.

The driving shaft or spindle —4— is provided with a co-axial handle —6— by which it may be rotated somewhat in the manner of a screw-driver. A beveled gear —7— is secured to the other end of the driving shaft or spindle —4— to abut against the adjacent end of the bearing.

This gear —7— meshes with a companion beveled gear —8— which is secured by a set screw —9— to the inner end of the tool shaft or spindle —5—.

This gear —8— and its clamping member —9— therefore serves as a chuck for receiving the tool spindle —5— which, as illustrated in Figures 1 and 2, is provided with a screw-driver tip —10— while in Figure 3 a similar tool shaft or spindle —5'— is provided with a socket —10'— adapted to be used for tightening and loosening bolts, nuts, and the like.

In Figure 4 the tool spindle as —5''— is connected by a universal joint —11— to a supplemental tool spindle —10''— shown as having a socket —10'— similar to that shown in Figure 3 for tightning and loosening nuts, bolts, and the like, although it is evident that the spindle —10''— may be substituted by the screw-driving spindle —5— shown in Figures 1 and 2, if desired.

The gears —7— and —8— engage the adjacent ends of their corresponding bearings —2— and —3— to hold their respective shafts against endwise movement in one direction, the other ends of the bearings —2— and —3— being engaged respectively by collars —7'— and —8'—.

When the device is used as an offset screw-driver, the screw-driving spindle —5— is provided with a screw supporting sleeve —12— slidable thereon and having its outer end provided with a plurality of, in this instance, three spring jaws —13— projecting from the outer end thereof in circumferentially spaced relation for receiving and supporting the head of a screw as —a— to be operated upon by the member —10—.

The purpose in moving the sleeve —12— axially upon the spindle —5— is to permit the insertion of the head of the screw between the jaws when the sleeve is moved outwardly and to cause the screw-driver to expel the screw from the jaws when the sleeve is moved inwardly.

The means for moving the sleeve —12— axially on the spindle —5— consists of a bell-crank lever —14— pivoted at —15— to the yoke —1— and having its shorter arm connected by a link —16— and pivotal screw —17— to the periphery of the sleeve —12—.

The other arm of the bell-crank lever —14— extends lengthwise of the shaft —4— along one side of the handle —6— where it is free and is easily engaged by the same hand which holds the handle end of the spindle —4— thereby facilitating the operation of said lever —14— and resultant adjustment of the sleeve —12— to different positions for receiving and ejecting the work, such as the screw —a—.

It will be observed that in each of the modifications the gear —8— and its screw —9— serves as a tool chuck for holding different forms of tools such as the screw-driver spindle —5— and socket wrench spindles —5'— and —5"— thereby extending the range of use of the device without adding extra parts for holding the various tools.

It will also be observed that the tool might be reversed end for end in the gear chuck —8— without departing from the spirit of this invention and that in either position of adjustment it has the further advantage of being rotatable bodily about the axis of the driving spindle —4— thereby further increasing its range of usefulness.

In operation of the screw-driving device shown in Figures 1 and 2, if it is desired to insert a screw into wood at an angle to the shaft —4—, the free end of the lever —14— may be depressed by the thumb of the hand engaging the handle —6— thereby forcing the sleeve —12— outwardly and permitting the head of the screw to be inserted between the jaws —13— where it will be temporarily held under the tension of said jaws.

The free end of the lever is then returned by the fingers of the hand engaging the handle —6— to engage the tip —10— of the screw-driving spindle —5— with the end face of the screw head so that by rotating the handle —6— and screw spindle —5— the tip —10— will be registered with the slot in the head of the screw so that the continued rotation of the handle —6— will cause the screw to enter the work.

Reversing the direction of rotation of the handle —6— will effect a similar reversing of rotation of the spindle —5— for withdrawing the screw —a— but in either case when it is desired to release the screw or to release the jaws —13— from the screw the free end of the lever —14— will be shifted to the position indicated by dotted lines in Figure 1 thereby effecting a corresponding movement of the sleeve —12— to eject the screw from the jaws —13—.

What I claim is:

An offset tool holder comprising a yoke having journal bearings at right angles to each other, a spindle journaled in one of said bearings and having at one end a co-axial handle by which it may be turned and at its opposite end a gear, a tool spindle journaled in the other bearing and having at one end a gear meshing with the first-named gear and at its opposite end an axial movable sleeve provided with spring jaws normally tensioned for yieldingly holding the work, a bell-crank lever pivoted to the yoke and provided with a relatively long arm extending along the first-named spindle and handle, and a link connecting the other arm of the lever with the sleeve for transmitting motion from the lever to the sleeve.

In witness whereof I have hereunto set my hand this 25th day of November, 1925.

JEREMIAH RYAN.